United States Patent [19]

Kijima et al.

[11] Patent Number: 4,559,895
[45] Date of Patent: Dec. 24, 1985

[54] POSITIONING DEVICE

[75] Inventors: Nobuo Kijima, Inagi; Yukio Hasegawa, Kawasaki, both of Japan

[73] Assignee: Mitsubishi Jidosha Kogyo Kabushiki Kaisha, Tokyo, Japan

[21] Appl. No.: 533,544

[22] Filed: Sep. 19, 1983

[51] Int. Cl.$^4$ .......................... G01D 13/22; F01B 7/10
[52] U.S. Cl. .......................................... 116/200; 91/1; 91/167 R; 92/62; 92/65
[58] Field of Search ....................... 116/200, 28.1, 268, 116/269, 272, 277, 283, DIG. 20, DIG. 21; 137/556, 556.3; 91/1, 167 R; 92/5 R, 62, 65

[56] References Cited

U.S. PATENT DOCUMENTS 3,713,364 1/1973 Francia ............................. 91/167 R
4,002,105 1/1977 Bell et al. ............................. 92/62

FOREIGN PATENT DOCUMENTS 47-46734 11/1972 Japan .

*Primary Examiner*—Steven L. Stephan
*Assistant Examiner*—Patrick R. Scanlon

[57] ABSTRACT

A positioning device capable of positioning a rod with a first piston fixed thereto into one of four positions selectively by means of a second piston disposed within a chamber A formed in a large-diameter cylinder portion and first, third and fourth pistons disposed within chambers B and C formed in a small-diameter cylinder portion. It is convenient to apply this positioning device to a select mechanism of a transmission or the like having four select positions.

12 Claims, 1 Drawing Figure

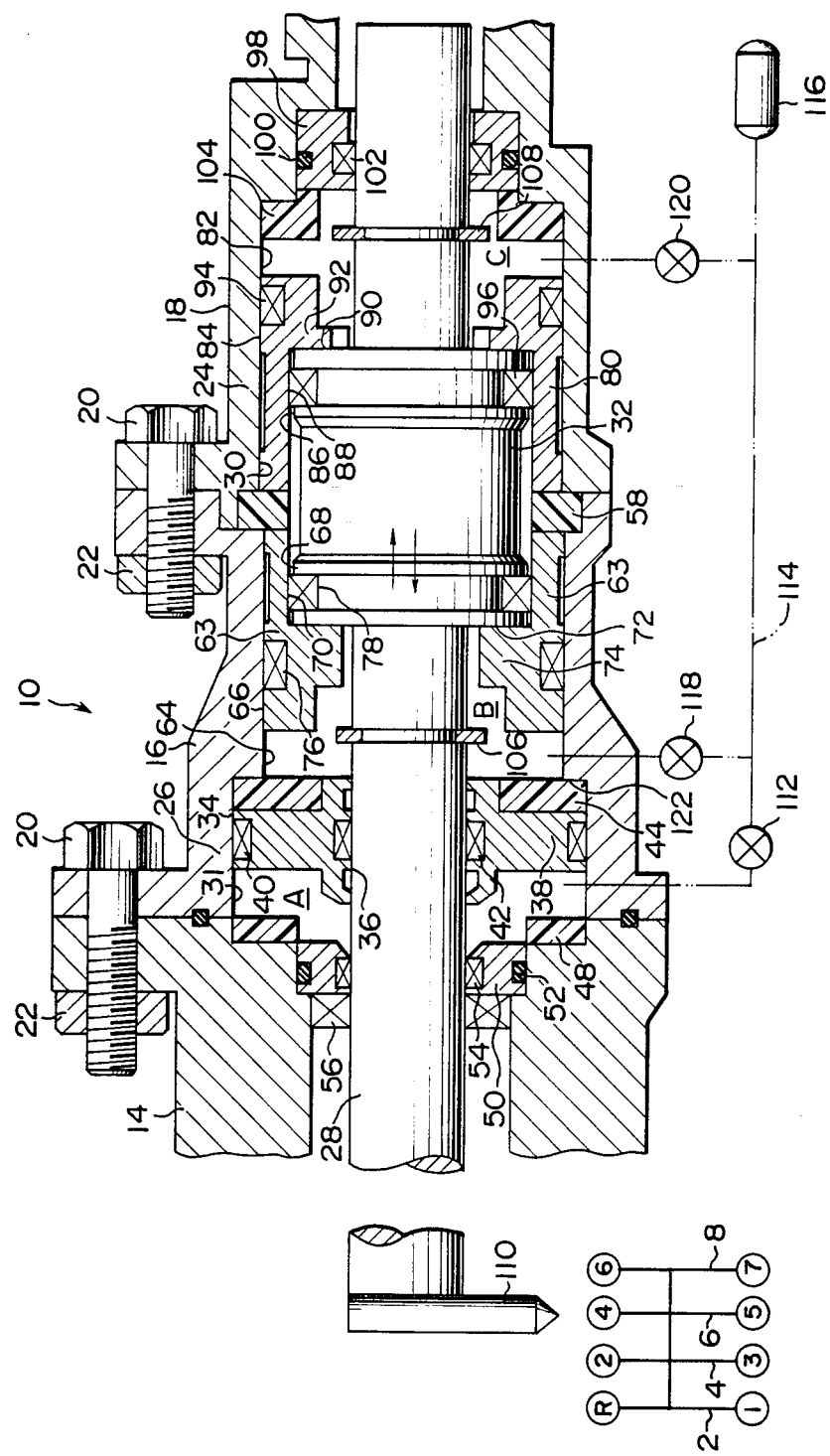

POSITIONING DEVICE

BACKGROUND OF THE INVENTION

1. Field of the Invention

The present invention relates to a positioning device.

2. Description of the Prior Art

In large-sized automobiles or like vehicles there has been used a system in which a change gear selecting device mounted at the vehicular rear portion is operated by operation of a change lever mounted at the vehicular front portion by the vehicular driver, and a transmission mounted also at the vehicular rear portion is remotely operated by the change gear selecting device.

Heretofore, automotive transmissions of five change gears have been popular, which are constructed so as to take three positions by movement in the shifting direction and take three positions by movement in the selecting direction normal to the shifting direction. Such transmissions have been operated by a change gear selecting device including a shift mechanism and a select mechanism which are disposed perpendicularly to each other and which are each capable of taking three positions by movement in a rectilinear direction. However, in order to decrease the fuel consumption, a transmission of seven change gears has been desired, and it has become necessary to provide a change gear selecting device having a shift mechanism capable of taking four positions.

SUMMARY OF THE INVENTION

The present invention has been proposed in view of the above-mentioned circumstances. It is the object of the present invention to provide a positioning device capable of accurately taking selectively one of four positions on a single axis.

In order to achieve the above-mentioned object, the positioning device of the present invention comprises a cylinder having a large-diameter portion and a small-diameter portion both formed on the same central axis; a rod extending through the cylinder; a first piston fixed to the rod; a second piston having an outer peripheral surface which engages the inner peripheral surface of the large-diameter portion; third and fourth pistons which are fitted in the small-diameter portion so as to be fitted over the first piston; a chamber A formed by the second piston and an end portion of the cylinder; a chamber B formed by the second and first pistons; and a chamber C formed by the first piston and the other end portion of the cylinder, the first piston being slidable together with the third piston within the chamber B and slidable together with the fourth piston within the chamber C, the second piston being slidable only within the chamber A, the third piston being slidable within the chamber B and slidable together with the second piston within the chamber A, with fluid being fed to the chamber A, B or C to selectively position the first piston fixed to the rod.

Thus, according to the positioning device of the present invention, the rod with the first piston fixed thereto can be positioned selectively in the range of first to fourth positions by means of the second piston disposed within the chamber A which is formed in the large-diameter portion and the first, third and fourth pistons disposed within the chambers B and C which are formed in the small-diameter portion. It is convenient to apply such positioning device to a select mechanism of a transmission or the like having four select positions.

BRIEF DESCRIPTION OF THE DRAWING

The accompanying drawing schematically illustrates an embodiment of the present invention.

DESCRIPTION OF THE PREFERRED EMBODIMENT

An embodiment of the present invention will be described hereinunder with reference to the accompanying drawing.

This embodiment is concerned with a select mechanism in a pneumatically operated change gear selecting device. As shown in the drawing, a select mechanism 10 is capable of selecting the four positions, which are a first select position 2 for selection of R (reverse) and a first speed, a second select position 4 for selection of second speed and third speed, a third select position 6 for selection of fourth speed and fifth speed and a fourth select position 8 for selection of sixth speed and seventh speed.

A first cylinder 14, a second cylinder 16 and a third cylinder 18 are fixed together with bolts 20 and nuts 22 to constitute a cylinder assembly having a small-diameter portion 24 and a large-diameter portion 26 which are contiguous to each other on the same central axis.

The reference numeral 28 denotes a rod for selectively operating change gears of a transmission (not shown). The rod 28 extends through both the small-diameter portion 24 and the large-diameter portion 26. In the small-diameter portion 24 is fixed a first piston 32 in spaced relation to an inner peripheral wall 30 of the small-diameter portion 24. On the other hand, in the large-diameter portion 26 is disposed a second piston 38 having an outer periphery 34 which is in sliding engagement with an inner peripheral wall 31 of the large-diameter portion 26 and also having an inner periphery 36 which is in sliding engagement with the outer peripheral surface of the rod 28. The numeral 40 denotes a hermetic seal member disposed between the outer periphery 34 and the inner peripheral wall 31, the numeral 42 denotes a hermetic seal member disposed between the inner periphery 36 and the rod 28, and the numeral 44 denotes a cushion formed of an elastic material such as nylon, the cusion 44 being integrally fixed to the second piston 38 to constitute an abutment against a second stopper 122 which decides the second select position 4 in the second piston 38.

The second piston 38 is slidable only within a chamber A formed by the large-diameter portion 26. The numeral 48 denotes a cushion formed of an elastic material. The cushion 48, which is fixed to an end face of the first cylinder 14, functions as a first stopper which decides the first select position 2. The numeral 50 denotes a metallic collar for guiding the rod 28, the collar 50 being press-fitted and held in the first cylinder 14. The numeral 52 denotes an O-ring disposed between the collar 50 and the first cylinder 14, the numeral 54 denotes a hermetic seal member disposed between the collar 50 and the rod 28, the numeral 56 denotes a dust seal disposed between the rod 28 and the first cylinder 14, and the numeral 58 denotes an annular stopper formed of an elastic material such as nylon, which functions as a third stopper which decides the third select position 6. The stopper 58 is held between the second cylinder 16 and the third cylinder 18, and it defines as chamber B the inside of the small-diameter portion 24 of the second cylinder 16 and defines as chamber C the inside of the small-diameter portion 24 of the third cylinder 18.

The numeral 63 denotes a cylindrical third piston disposed on the chamber B side with respect to the first piston 32. The third piston 63, which extends in the direction of the rod 28, has an outer periphery 66 which is in sliding engagement with an inner peripheral wall 64 of the chamber B, an inner periphery 70 which is in sliding engagement with an outer peripheral surface 68 of the first piston 32 and an annular overlap portion 74 which overlaps an end face 72 of the first piston 32. The numeral 76 denotes a hermetic seal member disposed between the outer periphery 66 and the inner peripheral wall 64, and the numeral 78 denotes a hermetic seal member disposed between the inner periphery 36 and the outer peripheral surface 68 of the first piston 32.

The numeral 80 denotes a cylindrical fourth piston disposed on the chamber C side with respect to the first piston 32. The fourth piston 80, which extends in the direction of the rod 28, has an outer periphery 84 which is in sliding engagement with an inner peripheral wall 82 of the chamber C, an inner periphery 88 which is in sliding engagement with an outer peripheral surface 86 of the first piston 32 and an annular overlap portion 92 which overlaps the other end face 90 of the first piston 32. The numeral 94 denotes a hermetic seal member disposed between the outer periphery 84 and the inner peripheral wall 82, and the numeral 96 denotes a hermetic seal member disposed between the inner periphery 88 and the outer peripheral surface 86 of the first piston 32.

The numeral 98 denotes a metallic collar for guiding the rod 28, the collar 98 being press-fitted and held in the third cylinder 18. The numeral 100 denotes an O-ring disposed between the collar 98 and the third cylinder 18, the numeral 102 denotes a hermetic seal member disposed between the collar 98 and the rod 28, and the numeral 104 denotes a fourth stopper which restricts the rightmost position of the fourth piston 80 for deciding the fourth select position 8. The fourth stopper 104 is formed of an elastic material and functions also as a cushion.

The numeral 106 denotes a snap ring as a return member fixed to the rod 28 within the chamber B, and the numeral 108 denotes a snap ring as a return member fixed to the rod 28 within the chamber C. When a selector member 110 fixed to one end of the rod 28 is moved from the third select position 6 as shown to the first or second select position 2 or 4, the third piston 63 is moved to the left in the drawing, and thereafter, when the selector member 110 is moved to the fourth select position 8, the snap ring 106 engages with the overlap portion 74 of the third piston 63 and causes the third piston 63 to return to the position shown, while the snap ring 108 likewise causes the fourth piston 80 to return to the position shown.

The chamber A is adapted to be supplied with a discharge pressure of an air tank 116 through a first solenoid valve 112 and an air passage 114, or open to the atmosphere. The chambers B and C are adapted to be supplied with the discharge pressure of the air tank 116 through a second solenoid valve 118 and a third solenoid valve 120, respectively, or open to the atmosphere.

The following description is now provided about the operation of the positioning device of this embodiment with reference to Table 1 below.

TABLE 1

| Select Position | First Solenoid Valve | Second Solenoid Valve | Third Solenoid Valve |
|---|---|---|---|
| 2 | x | x | o |
| 4 | o | x | o |
| 6 | o(x) | o | o |
| 8 | o(x) | o | x |

In Table 1, the select positions 2, 4, 6 and 8 represent the first to fourth select positions respectively shown in the drawing; the mark o indicates that the so-marked solenoid valve is in an energized state and that the associated chamber A, B or C is supplied with the discharge pressure of the air tank 116; and the mark x indicates that the so-marked solenoid valve is in a deenergized state and that the associated chamber A, B or C is open to the atmosphere.

First, for selecting the first select position 2, only the third solenoid valve 120 is energized to supply only the chamber C with the discharge pressure, while the chambers A and B are opened to the atmosphere. At this time, the first piston 32 is urged to the left in the drawing, so that the second piston 38 is urged to the left through the third piston 63 until it stops in the position where it abuts the cushion 48 which functions as the first stopper, while the third piston 63 stops in the position where it abuts the second piston 38, the first piston 32 stops in the position where it abuts the third piston 63, and the selector member 110 fixed to the rod 28 stops and is held in the first select position 2.

Next, in the state described above, if the first solenoid valve 112 is energized, the discharge pressure of the air tank 116 is fed to the chamber A, whereby the second piston 38 having a large sectional area is moved to the right in the drawing up to the position shown in the drawing (the position where the cushion 44 abuts the second stopper which decides the second select position 4), while the third piston 63 and the first piston 32 are held in the position of abutment with the second piston 38 by virtue of the pressure in the chamber C. At this time, the selector member 110 stops and is held in the second select position 4.

Further, in this state that the selector member 110 takes the second select position 4, if the second solenoid 118 valve is energized, the discharge pressure of the air tank 116 is fed to the chamber B, whereby the first piston 32 is moved to the right in the drawing. At this time, the third piston 63 is moved to the right together with the first piston 32 and stops in the position where it abuts the third stopper 58, while the first piston 32 is stopped and held in the vicinity of the stopper 58 by virtue of both the rightward urging force of the third piston 63 and the leftward urging force of the fourth piston 80, whereby the selector member 110 is stopped and held in the third select position 6. In this state, the second piston 38 does not exert an urging force on the first piston 32, so even if the first solenoid valve 112 is deenergized, the same operation is continued.

In this state that the selector member 110 takes the third select position 6, if the third solenoid valve 120 is deenergized, the chamber C is opened to the atmosphere, and since the chamber B is supplied with the discharge pressure of the air tank 116, the first piston 32 is moved to the right to move the fourth piston 80 up to the position of abutment with the fourth stopper 104, whereupon the selector member 110 is stopped and held in the fourth select position 8.

What is claimed is:

1. A positioning device comprising:
a cylinder having a large-diameter portion and a small-diameter portion both formed on the same central axis;
a rod extending through said cylinder;
a first piston fixed to said rod;
a second piston having an outer peripheral surface which engages the inner peripheral surface of said large-diameter portion of said cylinder;
third and fourth pistons which are fitted in said small-diameter portion of said cylinder so as to be fitted over said first piston;
a chamber A formed by said second piston and an end portion of said cylinder;
a chamber B formed by said second and first pistons; and
a chamber C formed by said first piston and the other end portion of said cylinder,
said first piston being slidable together with said third piston within said chamber B and slidable together with said fourth piston within said chamber C, said second piston being slidable only within said chamber A, said third piston being slidable within said chamber B and slidable together with said second piston, with fluid being fed to said chamber A, B or C to selectively position said first piston and thereby selectively position said rod.

2. A positioning device according to claim 1, wherein said second piston is slidably fitted over the outer peripheral surface of said rod.

3. A positioning device according to claim 1, wherein said third piston is provided with a first engaging portion for engagement with said first piston so as to be movable together with said first piston within said chamber B, and wherein said rod is provided with a return member for returning said third piston by engagement with a second engaging portion formed at an end face of said third piston on the side opposite to said first engaging portion, said return member being provided on the portion of said rod located within said chamber B.

4. A positioning device according to claim 1, wherein said fourth piston is provided with a first engaging portion for engagement with said first piston so as to be movable together with said first piston within said chamber C, and wherein said rod is provided with a return member for returning said fourth piston by engagement with a second engaging portion formed at an end face of said fourth piston on the side opposite to said first engaging portion, said return member being provided on the portion of said rod located within said chamber C.

5. A positioning device according to claim 1 including first and second stoppers provided at both end portions of said large-diameter portion for restricting the movement of said second piston to decide first and second positions of said first piston, a third stopper provided at an intermediate portion of said small-diameter portion for restricting the movement of said third piston to decide a third position of said first piston, and a fourth stopper provided at an end portion of said small-diameter portion for restricting the movement of said fourth piston to decide a fourth position of said first piston.

6. A positioning device according to claim 5, wherein said first stopper is formed of an elastic material for cushioning the abutment of said first stopper with said second piston.

7. A positioning device according to claim 5, wherein said second piston is equipped with an elastic member for cushioning the abutment of said second piston with said second stopper.

8. A positioning device according to claim 5, wherein said third stopper is formed of an elastic material for cushioning the abutment of said third stopper with said third piston.

9. A positioning device according to claim 5, wherein said fourth stopper is formed of an elastic material for cushioning the abutment of said fourth stopper with said fourth piston.

10. A positioning device according to claim 1, wherein said cylinder having large- and small-diameter portions formed on the same central axis is constructed disassemblably into plural cylinder portions.

11. A positioning device comprising:
a cylinder having a large diameter portion and a small diameter portion, both formed on the same central axis;
a rod extending through said cylinder;
a first piston in said small diameter portion of said cylinder and fixed to said rod, said first piston having a diameter less than the inner diameter of said small diameter portion of said cylinder;
a second piston in said large diameter portion of said cylinder and slidable on said rod,
an annular third piston slidable in said small diameter portion of said cylinder and surrounding said first piston with a portion engageable with one end of said first piston;
an annular fourth piston slidable in said small diameter portion of said cylinder and surrounding said first piston with a portion engageable with the other end of said first piston;
means for limiting axial movement of said third and fourth pistons,
a chamber A formed between said second piston and one end of said cylinder,
a chamber B formed between said first and second pistons,
a chamber C formed between said first piston and the other end of said cylinder, and
means for feeding pressure fluid selectively to chamber A, chamber B and chamber C to position said first cylinder and thereby said rod in selected positions.

12. A positioning device according to claim 11 in which said means for limiting axial movement of said third and fourth piston comprises means for cushioning impact of said pistons with said limiting means.

* * * * *